United States Patent [19]

Timoney

[11] 3,869,866

[45] Mar. 11, 1975

[54] INTERNAL COMBUSTION ENGINE TURBOCHARGER DRIVES AND CONTROLS

[75] Inventor: Seamus G. Timoney, Dublin, Ireland

[73] Assignee: Tectonics Research Ireland Limited, Dublin, Ireland

[22] Filed: Mar. 27, 1973

[21] Appl. No.: 345,269

[30] Foreign Application Priority Data
Mar. 30, 1972  Great Britain............... 14927/72

[52] U.S. Cl..................................... 60/607, 60/608
[51] Int. Cl............................................ F02b 37/04
[58] Field of Search........................ 60/13, 607, 608

[56] References Cited
UNITED STATES PATENTS

| 2,968,914 | 1/1961 | Birmann | 60/13 |
|---|---|---|---|
| 3,389,554 | 6/1968 | Wolf | 60/13 |
| 3,473,322 | 10/1969 | Wolf | 60/13 |
| 3,595,013 | 7/1971 | Brille | 60/13 |
| 3,603,079 | 9/1971 | Kickbusch | 60/13 |
| 3,739,572 | 6/1973 | Duerr | 60/13 |

Primary Examiner—C. J. Husar
Assistant Examiner—Warren Olsen
Attorney, Agent, or Firm—Dorsey, Marquart, Windhorst, West & Halladay

[57] ABSTRACT

Improved drives and controls for an exhaust gas turbocharger for an internal combustion engine in which the turbocharger is primarily driven by exhaust gases from the engine include an auxiliary hydraulic turbine which also has a driving connection to the turbocharger and which receives pressurized fluid from a fixed displacement pump to drive the turbine during certain operating conditions of the engine. The pump is connected to a rotary output shaft of the engine by means of a clutch member which selectively connects and disconnects the pump in response to a preselected operating characteristic of the engine. Such operating characteristic is selected from the group consisting of at least one of the engine speed, oil pressure, air manifold pressure, exhaust manifold pressure, and fueling rate characteristics of the engine. In a specific embodiment, the clutch is disconnected after the engine reaches a predetermined operating speed, as measured by a sensing unit or tachometer responsive directly to engine shaft speed, by sensing the pressure at which fluid is discharged from the pump and which corresponds to the preselected engine speed. In a preferred embodiment, the clutch control is also responsive to one of the operating characteristics of the engine for automatically disengaging the clutch in response to load conditions below a selected predetermined minimum, for example when the engine fuel demand rate is below 80 percent of the demand rate for maximum torque at a particular speed.

4 Claims, 2 Drawing Figures

INTERNAL COMBUSTION ENGINE TURBOCHARGER DRIVES AND CONTROLS

BACKGROUND OF THE INVENTION

This invention relates to improved turbocharger drives and controls for the provision of auxiliary energy to an exhaust gas turbocharger, as applied to internal combustion engines, for the supply of engine charge air.

Exhaust gas turbochargers for internal combustion engines are known in which the turbocharger is driven by the energy available in the exhaust gases of the engine. Such a turbocharger, in turn, supplies engine charge air to the internal combustion engine to which the turbocharger is connected. For example, the exhaust gases from such an engine, or a portion of such gases, may be used to drive a turbine having a rotary shaft which, in turn, carries a rotary compressor for supplying charge air to the internal combustion engine.

The expression "engine charge air" is intended to include the charge air to each of the cylinders of a multi-cylinder engine. "Auxiliary energy" is intended to include any addition of power to the turbocharger other than that provided by the exhaust gas of the engine.

In an internal combustion engine, the exhaust energy is a function of the power output, and therefore it is proportional to the engine speed for the full load fueling rate. Consequently at the lower end of the engine speed range, there is little energy in the exhaust gas and the power available to the turbocharger is low. The air supplied to the engine by the turbocharger is consequently low in quantity and low in pressure under this condition in conventional engine practice. Therefore, in the interest of avoiding smoke in the exhaust gases, it is necessary to reduce the fueling rate and hence the brake mean effective pressure (b.m.e.p.) of turbocharged diesel engines at low speed as compared with the high speed part of the working range.

Normally a compromise solution is adopted producing maximum b.m. e.p. in the middle of the speed range. A number of systems have been suggested to improve the charge air supply and permit higher b.m.e.p. to be obtained at the lower end of the speed range in a turbocharged internal combustion engine, and without incurring smoke in a diesel engine.

One such system incorporates a small hydraulic turbine on the shaft of the turbocharger and supplies energy to the turbocharger compressor from a high pressure oil jet. This oil jet would normally be provided by an oil pump driven from the output shaft of the engine. In practice the control of this oil supply is difficult due to the high pressure. Expensive solutions have been tried by using a variable displacement type pump, or, an electromechanical by-pass valve. In addition to their cost disadvantages, neither of these proposals eliminates the low pressure pumping losses that such a system itself generates. Moreover, when an oil pump is driven from the output shaft of the engine, the oil quantity will be approximately proportional to engine speed and a large excess of oil is provided at higher engine speeds. If a by-pass valve were to be used to spill this oil, such valves would be difficult to operate at the high pressures concerned. Furthermore the pump losses produce parasitic inefficiencies even when pumping at no pressure.

SUMMARY OF THE INVENTION

The present invention provides an improved apparatus for controlling the supply of energy to an exhaust gas turbocharger for a turbocharged engine in which the turbocharger is normally driven by the energy of exhaust gasses from the engine, and in which the engine has a rotary output shaft. Such apparatus includes an auxiliary hydraulic turbine having a driving connection to the turbocharger and having an inlet and outlet for pressurized fluid to drive the auxiliary turbine, in combination with a hydraulic pump having an outlet connected to deliver pressurized fluid to the inlet of the auxiliary turbine, and a clutch member for selectively connecting and disconnecting the pump to and from a rotary output shaft of the engine. The clutch includes a clutch control mechanism responsive to an operating characteristic of the engine for automatically disengaging the clutch and thus disconnecting the hydraulic pump from the engine output shaft in response to a predetermined of preselected value of such an operating characteristic. The preferred operating characteristics include at least one of the engine speed, oil pressure, air manifold pressure, exhaust manifold pressure, and fueling rate characteristics of the engine.

In its preferred form, the invention provides the desired control by using a simple fixed displacement type of hydraulic pump driven at a convenient speed to provide the required oil output for the auxiliary turbine at low engine speed. The clutch can be of the electromagnetic type and is automatically controlled to disengage the driving connection, when the auxiliary oil energy for the auxiliary turbine of the turbocharger is not required. By use of a suitable clutch according to this invention, the pump control can be of the on/off type, which eliminates the necessity for a bypass control and can also eliminate the zero pressure pump power losses.

The hydraulic pump has an inlet connected to an oil reservoir, such as the main oil reservoir of the internal combustion engine, and the auxiliary hydraulic turbine outlet is also connected for returning the oil from that turbine to the same reservoir. The control means for the clutch specifically includes sensing means responsive to the desired engine operating characteristic. One example involves sensing means responsive directly to engine shaft speed, such as a tachometer or speed-responsive switch. Alternately, the sensing means can be responsive to fluid pressure at the pump outlet, for automatically disengaging the clutch whenever a selected pressure, corresponding to a predetermined engine speed, has been reached. The preferred embodiment also provides a clutch control which is responsive to an operating characteristic of the engine for automatically disengaging the clutch in response to load conditions below a selected predetermined minimum. As one example, this minimum can be determined by sensing those engine characteristics which indicate when the engine fuel demand rate is below 80 percent of that for maximum torque at the particular speed. Whenever the engine fuel demand rate increases above that level, for example during early acceleration under substantial load, the clutch will be engaged to provide the auxiliary energy to the turbocharger by means of the auxiliary turbine. On the other hand, whenever the engine speed is above the level at which maximum torque occurs in the turbocharged engine without auxiliary energy assistance for the turbocharger, i.e., under the normal driving of the turbocharger through the exhaust gas energy of the engine, then the clutch will become disengaged and the provision of auxiliary energy to the turbocharger terminated.

Other features, variations and embodiments of the invention will be apparent from the following detailed description.

BRIEF DESCRIPTION OF THE DRAWINGS

In the drawings which form a part of this application, and in which like reference characters indicate like parts.

DESCRIPTION OF THE PREFERRED EMBODIMENTS

Figure 1:
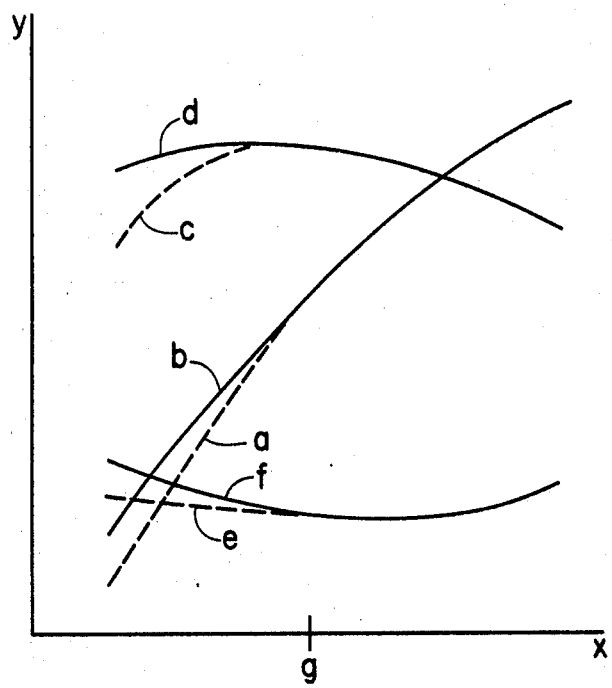
FIG. 1 is a graph of various engine performance characteristics, showing improvements which can be achieved by the present invention.

FIG. 1 shows in graphic form the results of tests with systems of the type shown and described hereinafter with reference to FIG. 2 of this application. Thus, tests with this system have shown that performance improvements as shown by the characteristic plots in FIG. 1 can be obtained with the type of control and auxiliary energy addition to a turbocharger, as provided by the present invention. The plot on the ordinate of FIG. 1 represents torque, or brake mean effective pressure and horsepower, and the plot on the abscissa represents engine speed. Curve $a$ shows the power without auxiliary energy, i.e., when the turbocharger is run without the auxiliary turbine supplying auxiliary energy to the turbocharger, while curve $b$ shows the power when such auxiliary energy is supplied to the turbine according to the invention. Curve $c$ represents the torque, or brake mean effective pressure without such auxiliary energy, while curve $d$ represents the same characteristic when auxiliary energy is supplied. Curve $e$ represents the specific fuel consumption, without the supply of auxiliary energy according to the invention, while curve $f$ shows such specific fuel consumption when auxiliary energy is supplied according to the invention.

Figure 2:
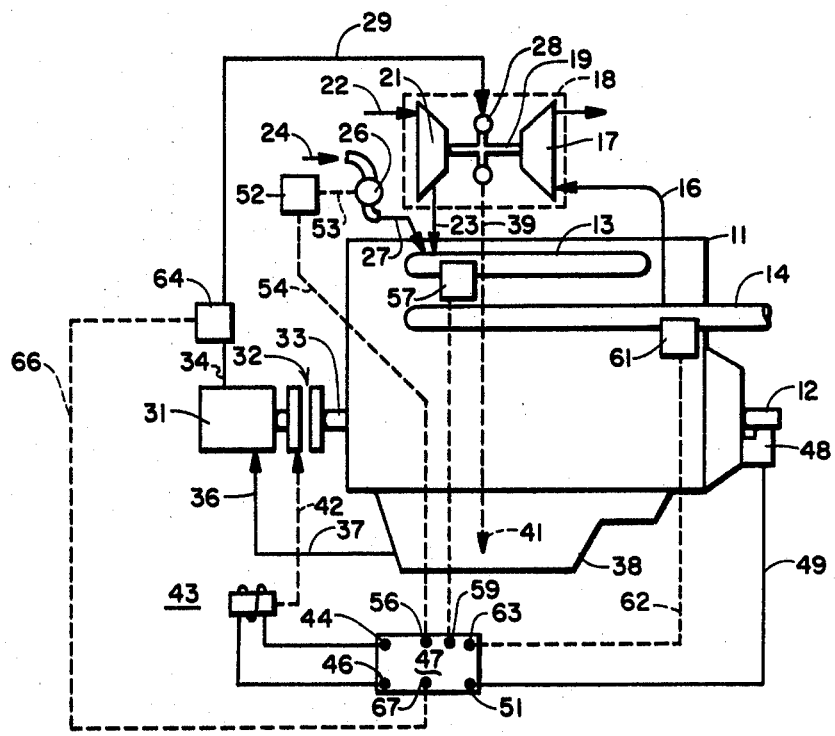
FIG. 2 is a partially schematic view of an internal combustion engine embodying an improved turbocharger drive and control system according to the invention.

The improved auxiliary energy system for the turbocharger and internal combustion is illustrated diagrammatically and schematically in FIG. 2. In this case the internal combustion engine, indicated generally at 11, has a rotary output shaft 12 for driving any desired device. An intake air manifold is shown generally at 13 and an exhaust manifold at 14. At least a part of the energy from the exhaust gasses is diverted as shown at 16 to drive a turbine 17 which is part of a turbocharger indicated in dotted outline at 18. Turbine 17 is secured to the turbocharger shaft 19, which also carries a compressor 21 for the supply of auxiliary air to internal combustion engine 11. Such air is fed to the compressor 21 as shown schematically at 22, and is discharged at 23 to an appropriate part of the main engine, such as manifold 13.

The main fuel supply for the engine is introduced at 24 under control of a suitable metering or fuel rate feeding valve 26, and the fuel supply is fed at 27 to the appropriate part of the engine, for example to intake manifold 13, or to individual fuel injectors (not shown). Such engine elements are well known to those skilled in the art and can be adapted with a suitable mixer or carburetor, and also with an appropriate ignition system, as desired, to achieve either compression ignition or spark ignition operation of the internal combustion engine.

According to the present invention, the turbocharger shaft 19 is provided with an auxiliary hydraulic turbine 28 which is driven by a jet of suitable liquid, such as oil, carried through an inlet pipe 29 from a pump 31. Pump 31 is a fixed displacement type of pump which is connected through a clutch mechanism 32 to a rotary output shaft 33, which may be the crankshaft of the engine and may be the same shaft or a different shaft from the shaft 12 previously described.

Fixed displacement pump 31 has its outlet 34 connected to the pipe 29 which serves as an inlet for the auxiliary hydraulic turbine 28 of the turbocharger. Pump 31 also has an inlet at 36 which is connected at 37 to a suitable oil reservoir, such as the oil sump 38 of the engine 11. An outlet 39 from the auxiliary turbine 28 returns the oil, which has been used to drive the auxiliary turbine to the same oil reservoir, as shown at 41.

The clutch connection at 32 is engaged and disengaged by a clutch control responsive to an operating characteristic of the engine for automatically disengaging the clutch in response to a predetermined value of such operating characteristic. As illustrated in FIG. 2, the clutch is controlled at 42 by a solenoid 43 having its actuating coil connected at 44 and 46 to a control mechanism and power source indicated schematically at 47. The control mechanism 47 is further connected in appropriate manner to one or more sensing devices which are responsive to the desired engine characteristics. For this purpose, a speed responsive sensing unit 48 is shown in connection with output shaft 12 to provide a signal proportional to the engine speed. This sensor has appropriate connections at 49 and 51 to the controlling switch mechanism 47 for the clutch solenoid 43, so that the clutch 32 will be disengaged to stop the operation of pump 31 and the supply of auxiliary turbine energy at 28, when a predetermined engine speed has been reached, as sensed by the sensor 48. The control of the system is maintained by selecting a drive ratio between the crankshaft speed and the pump speed, such that an acceptable maximum pressure is attained in the oil system through pump 31 and turbine inlet 29 at engine speeds below this particular preselected level. Referring to FIG. 1, this speed is one at which the curves $a$ and $b$, $c$ and $d$, and $e$ and $f$ converge. At speeds in excess of this point, which is illustrated in the graph of FIG. 1 at $g$, the system pressure would be too high, and the automatic disengagement of clutch 32 at such a speed eliminates the necessity for any expensive by-pass control and also eliminates the zero pressure power losses which would be involved if the pump continued to operate at such higher speeds. As shown by FIG. 1, the normal operation of supercharger 18 at engine speeds above this preselected control point can be readily provided by the energy available from the exhaust gases at these higher speeds.

Desired control of clutch 32 for the pump 31 may also be obtained in response to one or more additional engine operating characteristics, depending on the particular objective and application involved. For example, a sensing device 52 connected at 53 to the fuel supply valve 26 can be used to provide a signal proportional to the throttle position or fueling rate of the engine. Such a fuel rate sensor can be connected as shown schematically at 54 and 56 to the control switch mechanism 47. Similarly, a sensing device 57 responsive to air manifold pressure can be connected to the air manifold 13 at an appropriate location and connected in turn through connections 58 and 59 to the clutch control switch mechanism 47. A sensing device 61, responsive to exhaust manifold pressure in manifold 14, is similarly connected at 62 and 63 to the clutch control switch mechanism 47. It will be understood by those skilled in the art, that control switch mechanism 47 includes a suitable relay for energizing and de-energizing the control solenoid 43 for clutch 32, and that this relay can be controlled not only by the speed responsive sensing unit or tachometer at 48, as originally described, but also by one or more of the signals from the other sensing units responsive to fueling rate, air manifold pressure and exhaust manifold pressure.

As noted earlier, the pressure at pump outlet 34 is also proportional to the engine speed, depending on use of a fixed drive ratio between shaft 33 and pump 31. Thus a pressure sensing unit 64, which could be a pressure responsive switch, can also be connected at 66 and 67 to the clutch control mechanism 47 to disengage clutch 32 whenever the pressure at pump outlet 34 exceeds the acceptable maximum pressure previously noted.

Also according to this invention, the clutch control mechanism is responsive to at least one of the operating characteristics of the engine for automatically disengaging the clutch in response to load conditions below a selected predetermined minimum. For example, the control mechanism 47 can be made operative to disengage clutch 32 when the engine fuel demand rate is below 80 percent of the demand rate for maximum torque at any particular speed. This condition can be appropriately sensed in known manner by the sensing device 52 for the throttle position and, as required, with the aid of the sensing devices 57 and 61 responsive to intake and exhaust manifold pressures.

Thus an effective and economical improved turbocharger drive and control system has been described in which a fixed displacement pump is connected by a clutch to an output shaft of the engine and supplies fluid under pressure to an auxiliary turbine of the turbocharger, in order to supply desired auxiliary energy to the turbocharger to supplement the energy available from the exhaust gases of the engine. The clutch is disengaged to stop the operation of the pump and auxiliary turbine of the supercharger, whenever the speed of the engine served by the turbocharger exceeds a predetermined level and also whenever the engine fuel demand rate is below a specified level.

The described invention is economical in construction and effective in operation, and it does not require expensive variable displacement pumps or special bypass devices and controls. It also eliminates power losses in cases where a pump would otherwise have to continue to operate under zero pressure in connection with such a by-pass.

The foregoing specification sets forth some of the ways in which this invention may be practiced, including the best mode presently contemplated for carrying out the invention. Other modifications and variations may be apparent to those skilled in the art, in the light of the foregoing description and the following claims.

I claim:

1. Apparatus for controlling the supply of energy to an exhaust gas turbocharger for a turbocharged engine in which the turbocharger includes a compressor fixedly connected to an exhaust gas turbine driven by exhaust gases from the engine, and in which the engine has a rotary output shaft, said apparatus comprising an auxiliary hydraulic turbine fixedly connected to said exhaust gas turbine and compressor and having an inlet for pressurized fluid to drive the auxiliary turbine, a fixed displacement hydraulic pump having an outlet connected to said inlet to deliver pressurized fluid to the auxiliary turbine, said pump also having an inlet adapted for connection to a liquid reservoir from which said pump receives liquid for high pressure liquid delivery through the pump outlet to drive the auxiliary turbine, and a clutch member having connecting and disconnecting positions for selectively connecting and disconnecting the pump to and from such rotary output shaft of the engine.

2. Apparatus according to claim 1 having a clutch control responsive to an operating characteristic indicative of combustion air need of the engine for automatically disengaging the clutch member in response to a predetermined value of such operating characteristic and wherein said exhaust driven turbine, auxiliary turbine and compressor are fixedly mounted on a single rotary shaft.

3. Apparatus according to claim 2 in which the pump inlet is connected to an oil reservoir, and the auxiliary hydraulic turbine has an outlet connected to the same reservoir for returning oil thereto.

4. Apparatus according to claim 3 in which the operating characteristic to which the clutch control is responsive consists of at least one of the engine speed, oil pressure, air manifold pressure, exhaust manifold pressure, and fueling rate of the engine.

* * * * *